June 6, 1944.  M. B. VORDAHL  2,350,577

SPECIMEN GRIP FOR TESTING MACHINES

Filed May 16, 1942

INVENTOR
Milton B. Vordahl
BY Harold L. Gammons
AGENT

Patented June 6, 1944

2,350,577

UNITED STATES PATENT OFFICE 2,350,577

SPECIMEN GRIP FOR TESTING MACHINES

Milton B. Vordahl, Southport, Conn., assignor to Remington Arms Company, Inc., Bridgeport, Conn., a corporation of Delaware Application May 16, 1942, Serial No. 443,184

6 Claims. (Cl. 73—51)

This invention relates generally to tensile testing machines, and, particularly to grips for holding specimens of material to be tested.

The present invention consists primarily in providing testing machines with gripping surfaces which will automatically maintain axial loading of the specimen so as to insure a true measure of its tensile properties. A further object is to provide gripping surfaces which are mounted freely for rotational movement in planes parallel to the planes of gripping. A still further object is to provide wedge jaws with gripping buttons having work centering elements and substantially universal mountings in the jaws.

Other objects, features and advantages will appear upon reading the following detailed description of the apparatus for practicing the invention shown in the accompanying drawing, in which.

In the testing of materials, the elongation of the material in a given distance for a given force is determined by means of suitable machines which grip a strip of the material and exert tension thereon to stretch the specimen.

Figure 1:
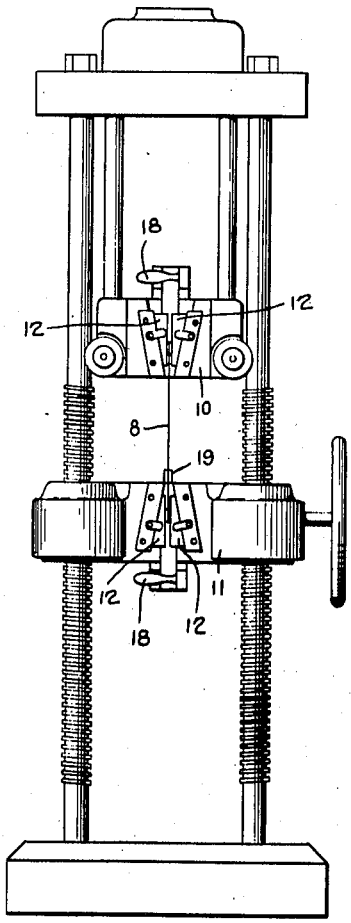
Fig. 1 is a front elevation of a well known type of testing machine modified to embody the novel features of the present invention.
Figure 2:
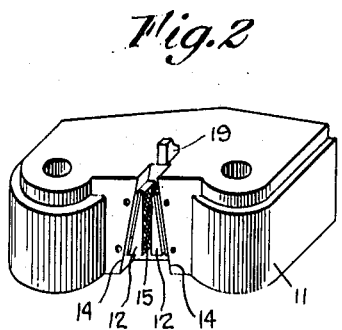
Fig. 2 is a perspective view of the lower jaw holder shown in Fig. 1, but provided with the usual type of wedge jaws.

One type of tensile testing machine in common use is the Riehle machine, a modification of which is shown in Fig. 1. The Riehle machine has two jaw holders indicated generally at 10 and 11, holder 10 being movable relative to the holder 11. The machine exerts tension on a strip or specimen 8, held in the jaws of the holders, and a scale (not shown) indicates the force applied, the force being exerted until the strip is broken. Each jaw holder of the Riehle machine carries two mating wedge-shaped jaws 12, 12 as shown in Fig. 2, which are supported to slide longitudinally in wedge-shaped slots 14 in the holder. The concurrent movement of the wedge-shaped jaws 12, with respect to the holder, in the direction of convergence of the slot 14, tends to bring the jaws together so as to grip a specimen firmly between the serrated faces 15 of the jaws.

It will be clear however to those familiar with tensioning machines that in many such machines the gripping members, such as 10 and 11, may be so supported, due to construction limitations in the machine, that even though the specimen is properly mounted between the gripping surfaces 15 of the wedge jaws 12, the center of the specimen is not actually coaxial with the line of action of the force existing between the gripping members when the specimen is being tensioned. Consequently, the specimen is not axially loaded and hence a true measure of the tensile strength of the specimen is not obtained.

A specific illustration is also found in those elongation testing machines, wherein the gripping jaws, or one of them, is supported from a tension rod which is connected at its opposite end to a pulling head, the connection being a universal joint such as a ball and socket. In this case, even though the gripping jaws have both longitudinal and rotational movement, the center of rotation of the jaws is about the point of suspension of the rod and not about the center of gripping so that after the strip is once grasped between the gripping surfaces of the jaws, any tendency of the specimen to align its axis with the actual line of force while the specimen is being tensioned sets up component forces in the strip which effect an improper measure of the tension force. This improper tensioning of the specimen is also effected, and to an even greater extent, whenever the specimen is improperly positioned between the gripping surfaces themselves, so that the axis of the specimen is eccentric to the theoretical line of strain.

Figure 3:
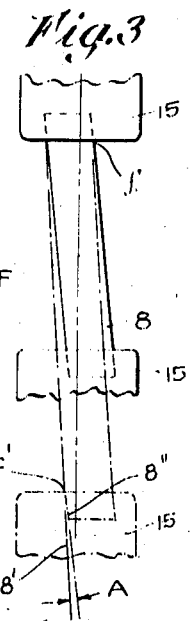
Fig. 3 is a diagrammatic illustration of a specimen eccentrically mounted in wedge jaws such as shown in Fig. 2, illustrating the forces set up when the specimen is tensioned.

Referring to Fig. 3, which illustrates diagrammatically the forces acting on an eccentrically loaded specimen 8, it will be seen that, as a consequence of any eccentricity of the axis of the specimen to the theoretical line of force F in the plane of the specimen, component forces $f$ are set up in the elongated specimen at substantially right angles to the line of strain F, which forces tend to produce transverse tears in the specimen adjacent the ends of the gripping surfaces 15.

At this point, it may well be emphasized that the destructive tearing forces are set up in the specimen when the axis of the specimen is eccentric to the theoretical line of force in the plane of the specimen but that to tension a specimen, all points of which are not in the same plane i. e. which is bent, at the point of gripping from the theoretical line of action of the force will not set up tearing forces.

The measure of the tearing forces $f$ is indicated by the angle A formed by the prolongation of the side 8' of the specimen when in its elongated position and the side 8'' of that portion of the specimen which is gripped between the gripping surfaces 15.

In thin strips of material, such as cloth or metal, these component forces will either tear the specimen or seriously affect the results and thus impair the true measure of tensile properties.

Figure 4:
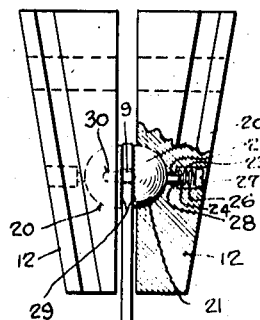
Fig. 4 is a view, in front elevation, partly in section, of two sets of wedge jaws such as shown in Fig. 2 but modified so as to include hemispherical button gripping members.

The present invention proposes the use of gripping members comprising hemispherical button inserts 20 in the faces 15 of the sliding jaws 12, as shown in Fig. 4, adapted to provide gripping surfaces rotatable about the center of gripping. To this end, each jaw member 12 has a hemispherical recess or socket 21 in its face 15, the socket being somewhat shallow in comparison with the thickness of the button so that the gripping surface of the button lies above the surface 15; and provided with an aperture 22 located at substantially the bottom of the socket. The aperture 22 extends substantially horizontally through the jaw and terminates in a counterbored portion 23 at the outside edge of the jaw. Each hemispherical button 20 is adapted to be seated within the hemispherical socket 21 and to be held therein by means of resilient fastening means which may comprise a screw 24 threaded into a hole 25 in the bottom of the button and a spring 26 carried on the screw and compressed between the head 27 of the screw and the shoulder 28 formed by the counterbore 23. The dimensions of the aperture 22 and counterbore 23 will be understood to be properly proportioned relative to the diameter and length of the screw 24 so that the latter may have sufficient freedom of movement in the aperture 22 to permit substantially universal movement of the button 20 in its socket 21.

While the buttons are arranged for substantially universal movement, it will be understood that when gripping a fenite specimen, the buttons will be free to rotate but primarily in the plane of the specimen, thus permitting the axis of the specimen to automatically align itself with the line of force being applied to the specimen.

The face 29 of each button may be roughened or provided with substantially vertical serrations or teeth adapted properly to grip the specimen strip for all angular positions of the buttons and is shown elevated above the surface 15 of its sliding jaw by reason of the relative shallowness of the jaw socket 21.

Figure 6:
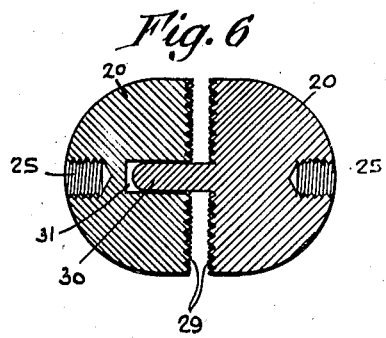
Fig. 6 is a side elevation of one set of hemispherical button gripping members showing specimen guide means.

Suitable guide means for centering the specimen on the gripping teeth of the buttons are shown in Fig. 6, wherein one of the cooperating buttons is provided with a pin or protuberance 30 mounted to project centrally from the face 29 of the button and to cooperate with a centrally located aperture 31 in the mating button when the buttons are drawn into cooperative engagement. The test strip 8, see Fig. 4, is shown with a hole 9 centrally located in one end thereof, through which the pin 30 passes, thereby centering the specimen between the gripping members so that the axis of the specimen falls near the center of gripping.

Figure 5:
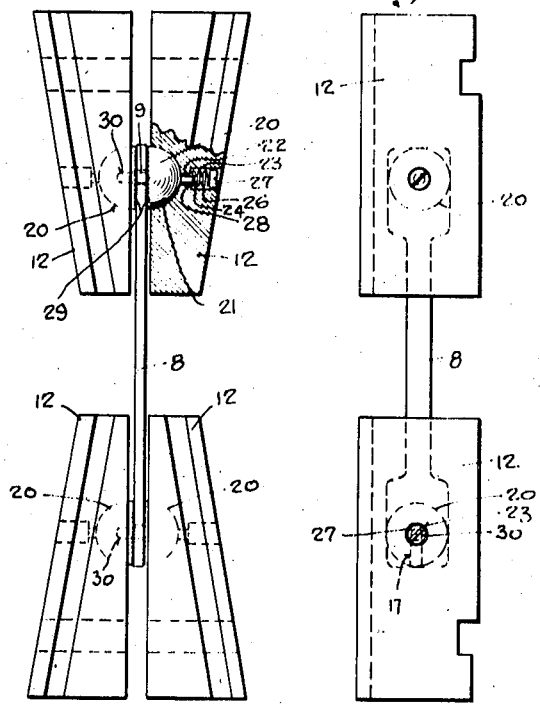
Fig. 5 is a side elevation of the jaws shown in Fig. 4 showing a specimen clamped between the gripping surfaces of the hemispherical buttons.

The lower pair of hemispherical buttons may also be provided with a pin and recess similar to the upper pair of buttons, in which event it is desirable from the standpoint of facile operation to provide a vertical slot 17, as shown in Fig. 5, instead of a hole in the lower end of the specimen so that the specimen may be more readily inserted over the pin of the lower buttons.

Although the use of a pin in both upper and lower sets of buttons has been proposed, the pin may be eliminated from the lower button. In such case, the lower end of the strip may be properly centered between the lower button gripping surfaces by swinging the strip about the upper pin until the rear edge of the lower portion of the strip 8 is brought into engagement with a suitable stop device, such as indicated generally at 19 in Figs. 1 and 2 which is supported in a predetermined position on the lower holder 11.

Figure 7:
Fig. 7 is a plan view of the gripping surface of one of the buttons showing a modification of the specimen guide means of Fig. 6.

A further modification is shown in Fig. 7, wherein the gripping surface of one button is shown provided with spaced guide members 32 comprising parallel flanges 33 adapted to locate the end of the specimen near the center of gripping. The face of the complementary button will be provided with recesses adapted to accommodate the flanges 33 when the buttons are closed. Guides of this type have the advantage that no apertures need be made in the specimen.

In carrying out a test, the jaws 12 of the upper holder 10 are raised relative thereto by the usual lever and claw, designated generally at 18, as shown in Fig. 1, whereupon the faces 15 of the jaws are drawn apart. The gripping surfaces 29 of the hemispherical buttons 20 are simultaneously separated sufficiently so that the operator may insert the end of the specimen between the upper button gripping surfaces and locate the end of the specimen at substantially the center of gripping by one of the aforesaid guide means. The jaws may then be lowered downwardly, concurrently, in the converging slot 14, whereupon the jaws move toward each other and cause the gripping surfaces of the buttons to grasp the specimen firmly. Since the gripping faces of the buttons are raised above the surfaces of the jaws, the specimen is grasped solely between the faces of the rotatable buttons. The lower end of the specimen may be similarly grasped between the gripping surfaces of the buttons of the lower holder.

In this connection, a further advantage in the use of hemispherically mounted gripping surfaces will be noted; namely, that in the event that either end of the strip is uneven or not uniform in cross section at the point of engagement by the gripping surfaces 29, these surfaces may readily tilt so as to conform to the face of the strip at the point of gripping without disturbing the coaxial alignment of the center line of the strip and the theoretical line of action of the tensioning force.

When power is applied to move the holders 10 and 11 longitudinally relative to each other, it is apparent that the gripping surfaces 29 will be moved closer together and more firmly grasp the test strip.

In the event that the strip has been inserted between the gripping surfaces in eccentric relation to the line of force being applied, the buttons will readily rotate within the sockets 21 of the wedge jaws and thereby automatically adjust themselves so that the center line of the strip is made coaxial with the line of action of the force being exerted on the strip. Consequently, the desired axial loading is obtained and the force exerted on the strip will be uniform across the width thereof and no tearing or uneven strain will result. It will be clear that the automatic displacement of the gripping surfaces of the hemispherical buttons is effected by rotation of the surfaces about the point of gripping as distinguished from rotation about a point of suspension remote from the point of gripping.

As the invention is believed to provide a novel, improved testing machine grip, it is not limited to the particular machines or details described herein and shown in the accompanying drawing, but is to be construed as covering all equivalent devices falling within the scope of the appended claims.

What is claimed is:

1. In a specimen grip for testing machines, a jaw holder having converging surfaces, jaw members in sliding engagement with said converging surfaces whereby concurrent movement of said jaw members opens or closes them, a complementary gripping member universally mounted in each jaw member and provided with a gripping surface, projecting means on one gripping surface, and means on the adjacent gripping surface adapted to cooperate with said projecting means for locating, on a test specimen, the line of action of the force exerted.

2. In a specimen grip for testing machines, a jaw holder having converging surfaces, jaw members in sliding engagement with said converging surfaces whereby concurrent movement of said jaw members opens or closes them, a complementary gripping member universally mounted in each jaw member and provided with a gripping surface, and a pin on one gripping surface adapted to cooperate with a recess on the adjacent gripping surface for locating a test specimen at substantially the center of gripping.

3. In a specimen grip for testing machines, a jaw holder having converging surfaces, jaw members in sliding engagement with said converging surfaces whereby concurrent movement of said jaw members opens or closes them, a complementary gripping member mounted in each respective jaw member, said gripping members comprising hemispherical buttons having substantially planar serrated gripping surfaces; a protuberance on the surface of one button adapted to cooperate with a recess in the adjacent gripping surfaces of the second button, hemispherical sockets in said jaw members; and resilient means for fastening said buttons in said hemispherical sockets.

4. In a thin strip specimen grip for testing machines, a jaw holder having converging surfaces, jaw members in sliding engagement with said converging surfaces whereby concurrent movement of said jaw members in the direction of the convergence of said surfaces closes said jaw members, hemispherical sockets in adjacent faces of said jaw members, a complementary button gripping member seated in each socket, said buttons having substantially planar serrated surfaces, specimen centering means on the adjacent planar surfaces of said buttons; and resilient fastening means for securing said buttons for rotating movement in said sockets.

5. In a specimen grip for testing machines, a jaw holder having converging surfaces, jaw members in sliding engagement with said converging surfaces whereby concurrent movement of said jaw members opens or closes them, a complementary gripping member having a serrated gripping surface mounted in each respective jaw member; means for mounting said gripping members in the adjacent faces of said jaw members whereby said gripping surfaces project from the faces of said jaw members; and means projecting from the surface of one gripping member adapted to cooperate with a recess in the surface of the complementary gripping member when said members are in engagement.

6. In a thin strip specimen grip for testing machines, a jaw holder having converging surfaces, jaw members having counterbores and in sliding engagement with said converging surfaces whereby concurrent movement of said jaw members in the direction of the convergence of said surfaces closes said jaw members, hemispherical sockets in adjacent faces of said jaw members, said sockets having apertures to said counterbores, rotatable button gripping members seated in said sockets; and resilient means for securing said buttons for limited rotatable movement in said sockets, said securing means comprising a pin projecting from the bottom of each button and having a loose fit in the aperture of its respective socket, and a coil spring on each pin seated in the corresponding counterbore of said socket.

MILTON B. VORDAHL.